United States Patent [19]

Jones et al.

[11] Patent Number: 5,684,984
[45] Date of Patent: Nov. 4, 1997

[54] SYNCHRONIZATION AND REPLICATION OF OBJECT DATABASES

[75] Inventors: Anne Jones, Redwood City; Craig Zarmer, Mountain View, both of Calif.

[73] Assignee: Apple Computer, Inc., Cupertino, Calif.

[21] Appl. No.: 314,951

[22] Filed: Sep. 29, 1994

[51] Int. Cl.$^6$ ............................................. G06F 17/30
[52] U.S. Cl. ...................... 395/610; 395/611; 395/613; 395/614; 395/616; 395/479; 395/342
[58] Field of Search ........................... 395/650, 157, 395/600, 425, 610, 611, 613, 614, 616, 479, 342; 364/408, 401; 348/7; 379/207

[56] References Cited

U.S. PATENT DOCUMENTS

| | | | |
|---|---|---|---|
| 4,799,156 | 1/1989 | Shavit et al. | 364/401 |
| 4,961,137 | 10/1990 | Augusteijn et al. | 364/200 |
| 5,093,911 | 3/1992 | Parks et al. | 395/600 |
| 5,220,501 | 6/1993 | Lawlor et al. | 364/408 |
| 5,220,657 | 6/1993 | Bly et al. | 395/425 |
| 5,241,673 | 8/1993 | Schelvis | 395/600 |
| 5,287,447 | 2/1994 | Miller et al. | 395/157 |
| 5,303,375 | 4/1994 | Collins et al. | 395/650 |
| 5,307,456 | 4/1994 | MacKay | 395/154 |
| 5,307,490 | 4/1994 | Davidson et al. | 395/650 |
| 5,319,455 | 6/1994 | Hoarty et al. | 348/7 |
| 5,404,505 | 4/1995 | Levinson et al. | 395/600 |
| 5,418,844 | 5/1995 | Morrisey et al. | 379/207 |

OTHER PUBLICATIONS

Hao et al., "VIZIR: An Integrated Environment for Distributed Program Visualization", IEEE 1995.
Lamb et al.; "Lan-Based Office for the Enterprise, A Case Study", IEEE, 1994.
Natale et al., "Dynamic End-to End Guarantees in Distributed Real Time Systems", IEEE, 1994.
Gersham et al., "Use of Hypermedia for Corporate Knowledge Dissemination"; IEEE 1993.
Haefner, "Method For Building A Hypermedia Information Management Tool", PCT/World Intellectual Property Organization, 10913 World, pp. 1–66, Sep. 20, 1990.
Wolf, "The (Second Phase of the) Revolution has Begun", Wired Magazine, Wired Ventures Ltd., p. (116–21; 150–2) (1994).

*Primary Examiner*—Thomas G. Black
*Assistant Examiner*—C. Lewis
*Attorney, Agent, or Firm*—Burns, Doane, Swecker & Mathis, L.L.P.

[57] ABSTRACT

The present invention, generally speaking, provides a method of synchronizing information between a plurality of sites and a central location that solves number of potentially "thorny" problems of distributed database systems in an elegant and efficient manner. The first issue involves sychronizing different copies of an item on machines that are not continuously linked at which each copy may be changed independently. Rather than attempting to formulate a set of synchronization policies generally applicable to all items in all instances, synchronization policies are moved from the database engine to the items themselves. The second issue involves lifetime—knowing, given a complex set of interrelationship of items, when an item may be safely deleted. This problem is addressed by providing an interested party mechanism whereby items may "express interest" in each other. When no item is interested in a particular item, that item may safely "go away".

11 Claims, 9 Drawing Sheets eWorld Export Preferences

Local RMP Folders

[Set] RMP Export Folder
AOS Central:eWorld Stuff:eWorld Pressed Beef:eWorld Root:RMP Export

[Set] RMP Response Folder
AOS Central:eWorld Stuff:eWorld Pressed Beef:eWorld Root:RMP Responses

[Set] RMP Problem Folder
AOS Central:eWorld Stuff:eWorld Pressed Beef:eWorld Root:RMP Problem Folder

[Set] RMP Backup Folder
AOS Central:eWorld Stuff:eWorld Pressed Beef:eWorld Root:RMP Responses

Upload Parameters

Stratus Dir Path: [Stratus Root>RMP Processes>BS Files]

Screen Name: [Edit Text]

Stratus User Name: [Edit Text]    RMP Password: [Edit Text]

Stratus Password: [Edit Text]    # retry attempts to upload: [35]

[Cancel]  [OK]

*FIG. 10*

SYNCHRONIZATION AND REPLICATION OF OBJECT DATABASES

BACKGROUND OF THE INVENTION

1. Field of the Invention

The present invention relates to the synchronization and replication of databases and is particularly applicable to information creation, management and publication of a type typically peformed by online services.

2. State of the Art

Online services (such as Compuserve, Genie, Prodigy, America Online, and more recently e•World, among others) have become increasing popular as the price of computers and modems has decreased. At the same time as media attention has been directed toward the "information superhighway," particularly the Internet, subscription to and usage of online services of all descriptions has continued to increase.

From the perspective of a computer user, online services have become easier to use. Command-line interfaces have been replaced by front-end search tools and graphical user interfaces. As with a play, however, much "behind-the-scenes" work is involved in creating, managing and publishing information to an online service.

Presently, information publishers take portions of their content in whatever for they have it—typically a collection of files in the publisher's filing system—and from that content produce directly a script of some sort, for example in a scripting language such as Rainman Pro, characterized by numerous embedded commands. Publishers have to manually keep track of the ID numbers that they use on a particular host. The same manual process is performed from scratch for each different service that the publisher publishes on. Not only is there no one tool that can support a publisher across each of a variety of platforms, but there does not appear to be so much as a tool that can support a publisher on even a single platform (i.e., America Online, Compuserve, Prodigy). The task is left very much up to each publisher to construct an update script based on various documents, following all of the rules of the applicable scripting language, sometimes literally keeping a spiral notebook to keep track of IDs used on various services.

Whatever tools may have been developed to facilitate the foregoing process are generally custom, in-house tools. To the inventors's best knowledge, there does not presently exist any general-purpose tool to allow an information provider to easily create, manage and publish information to an online service.

Furthermore, in electronic publishing systems, different copies of an item typically reside on different machines, i.e., the information provider's machine and the online service's machine. Such systems are in effect distributed database systems, and raise a number of potentially "thorny" problems typical of distributed database systems. The first issue involves synchronizing different copies of an item on machines that are not continuously linked at which each copy may be changed independently. The second issue involves lifetime—knowing, given a complex set of interrelationship of items, when an item may be safely deleted.

At least one commercial software product, Lotus Notes, partially addresses the problem of synchronization. Lotus Notes is a "groupware" application that provides some ability to synchronize changes made to the same information items at different sites. However, it is limited in the options it provides for resolving conflicts in those changes.

SUMMARY OF THE INVENTION

The present invention, generally speaking, provides a method of synchronizing information between a plurality of sites and a central location that solves number of potentially "thorny" problems of distributed database systems in an elegant and efficient manner. The first issue involves synchronizing different copies of an item on machines that are not continuously linked at which each copy may be changed independently. Rather than attempting to formulate a set of synchronization policies generally applicable to all items in all instances, synchronization policies are moved from the database engine to the items themselves. The second issue involves lifetime—knowing, given a complex set of interrelationship of items, when an item may be safely deleted. This problem is addressed by providing an interested party mechanism whereby items may "express interest" in each other. When no item is interested in a particular item, that item may safely "go away."

The method of synchronizing information provides the basis of a powerful yet easy to use electronic publishing tool for information providers and online service operators. The electronic publishing tool allows information providers to manage the content they provide to online services. It also reduces the effort required by operations staff of online services to support a growing number of information providers. Finally, the electronic publishing tool allows content to be captured from information providers so that it can be published onto a variety of platforms with minimal additional effort. For example information, in addition to or in lieu of being published on an online service, may be published on CD through a facility such as AppleLink CD (AppleLink CD allows a portion of the "static" content of an online service such as AppleLink to be published and distributed in CD form, with the result that the content is infinitely reusable without incurring connect charges.) Furthermore, information previously published on one online service may be published on one or more other online services, or information may be published on several online services at the same time.

The electronic publishing tool is based on a modular server architecture. In a preferred embodiment, the electronic publishing tool uses an object-oriented, extensible representation of content and provides an infrastructure for the storage of objects, synchronization of changes to objects between an information provider and an online service, and interfaces (gateways) to foreign systems such as another online service.

In practice, information providers will have one system running one version of the electronic publishing tool at their site. That version will communicate with another version of the electronic publishing tool system run by a central service, such as an online service, which in turn will publish onto various platforms.

The capabilities of the electronic publishing tool and how it supports the publishing process, as well as the particular architecture of the electronic publishing tool and its handling of distributed database issues in accordance with a preferred embodiment of the invention, may be understood from the following detailed description in conjunction with the appended drawing.

BRIEF DESCRIPTION OF THE DRAWING

FIG. 10 is a diagram of an Export Preferences dialog box;

DETAILED DESCRIPTION OF THE PREFERRED EMBODIMENTS

Figure 1:
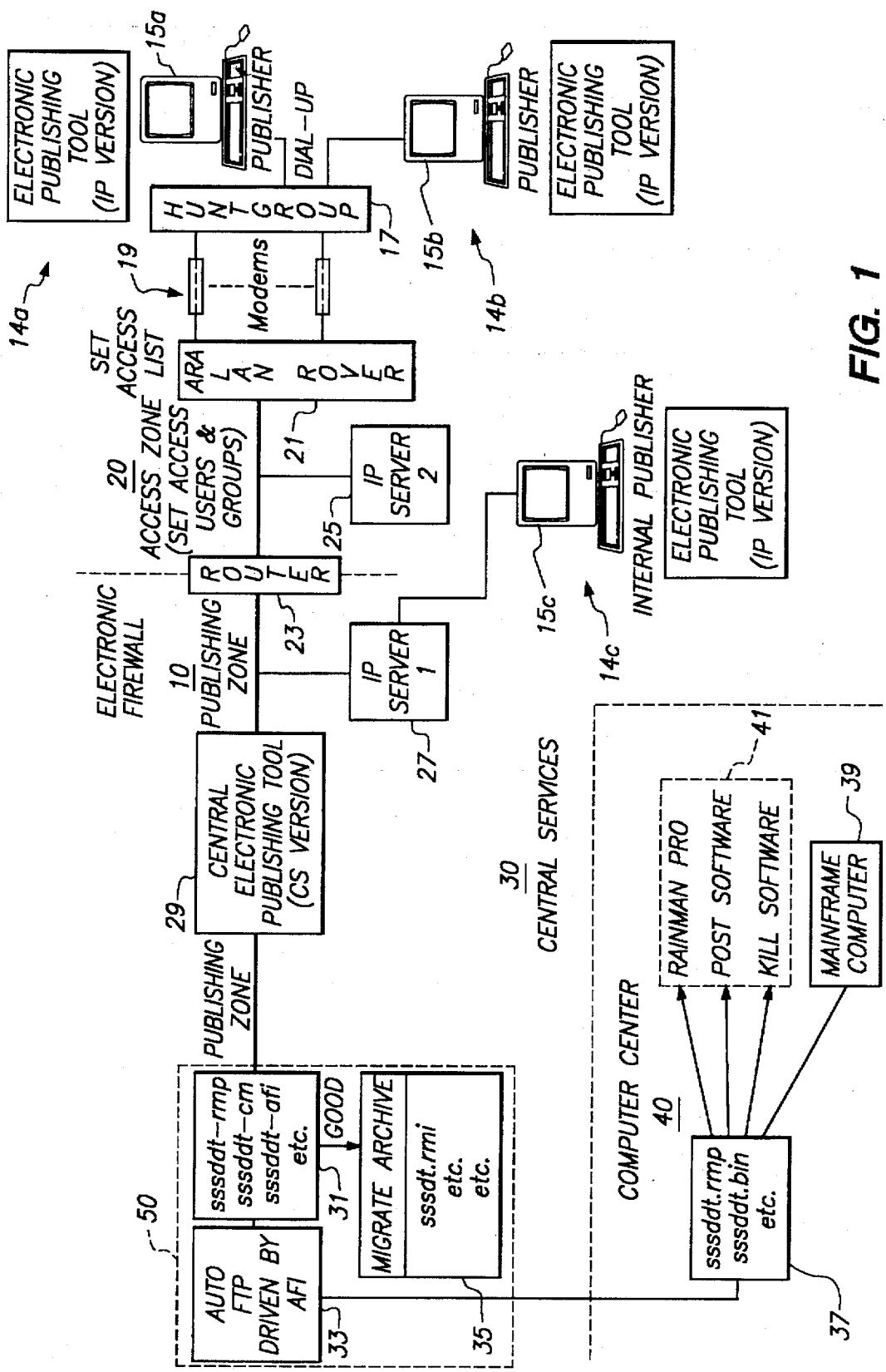
FIG. 1 is a block diagram of an electronic publishing system incorporating the electronic publishing tool of the present invention.

For convenience of description, the present invention will be described in detail in relation to the Apple Macintosh computer system, its system software, system software extensions, related applications including AppleTalk Remote Access (ARA), and related program development software, including MacApp. ARA is so-called "dial-in" software that provides access to computer networks, file servers, electronic mail servers, etc. MacApp is a program development library for object-oriented programming. It should be understood, however, that the invention is broadly applicable to graphical, event-driven computer systems of all types as well as to different operating environments and different graphical user interfaces including, for example, X Windows, AUX, Microsoft Windows, MOTIF, etc. The underlying architecture of the invention is portable to a variety of other hardware and software platforms.

The present electronic publishing tool is embodied in two different forms, or two different software versions. One version (the IP version) is for use by information providers (IPs), and the other version (the CS version) is for use by a central service, such as an online service, by its operations staff. The two versions differ mainly in that the IP version has several functions removed from the user interface. The IP version allows for day-to-day content import and management with minimal support. The central service version, because central service operations are more complex and may be expected to continually evolve, will typically have user interfaces requiring more training and/or support. Information providers and operations staff of the central service use the electronic publishing tool to import content, to arrange it in a navigation structure (e.g., a folder-like hierarchy), and designate portions to be published onto various platforms.

IPs use their version to import, create, and manage their collection-based content for the central service. ("Collection-based" content refers to static, hierarchical, read-only material, as opposed to various types of interactive, subscriber-produced content such as e-mail, chat rooms, etc.) Periodically the information providers, after making a set of changes they then wish to effect, will publish the changes they have made. A set of files are generated which are sent to the central service via ARA or an equivalent file transfer program.

Normally, the central service's version will run virtually unattended. It monitors the ARA server for changes from IPs. When changes are found, it incorporates those changes into its own database. The process of updating the central service's version to reflect changes made by an IP is referred to as synchronizing.

At a set time, or on demand, the central service's version begins generating a scripting language or other appropriate file (for example, a Rainman Pro file) that is sent for processing by a particular online service via an automatic file transfer program (AutoFTP). The central service's version is such that operations staff can also interactively create and rearrange content just as IPs can (although this capability is expected to be used infrequently).

Referring now to FIG. 1, publishers at different sites (14a, 14b, etc.) each use the IP version of the present electronic publishing tool, running on a standard personal computer equipped with a modem (15a, 15b, etc.), to generate and update content to be published. Change files reflecting content changes are sent to the central service via a dial-up connection using a specified telephone number.

The main activity within the publishing zone 10 is performed by a central electronic publishing tool 29 (the CS version) in response to change files picked up from the primary IP server 27. The central electronic publishing tool 29 may be a single copy of the CS version running on a single powerful PC or may be multiple copies each running on a separate PC and assigned to handle separate groups of IPs. In other embodiments, a network CS version of the electronic publishing tool may be run on a network of computers. The specific hardware implementation chosen is not important to the present invention.

The central electronic publishing tool 29 effects changes described in change files stored on the primmer IP server 27 by processing the change files using one more program entities specific to a particular online service or other service. Export files are then stored on a server 50 providing a "back-door" to a computer center 40 of the target service. In the case of e*World, for example, an program. entity specific to e*World generates the files indicated above the dashed line in block 31, most importantly a Rainman Pro or "dot rmp" file, sssddt.rmp.

The electronic publishing system of FIG. 1, apart from standard personal computer hardware, primarily requires large, fast disk storage. IPs need enough storage to hold all of the content they wish to publish. In one embodiment, the central electronic publishing tool 29 requires enough storage to hold the all of the content from all of the IPs. Other embodiments may allow the central service to obtain content dynamically from IPs, thus eliminating some of the local storage requirements.

Although the particular user interface employed by the IP and CS versions of the electronic publishing tool is not important to the present invention, an exemplary user interface will be described in relation to FIG. 2 through FIG. 11. If the central service is an online service, human interface considerations may recommend an interface that closely resembles the subscriber interface of the online service. Likewise, although the program functions described in relation to the tool, some functions described may not be required and other functions may be added depending upon particular circumstances. The following description assumes that the types of content objects supported by the electronic publishing tool include at least text documents, folders and enclosures. Other types of content objects, including books, pamphlets, chats, forms, etc., may or may not be supported.

Figure 2:
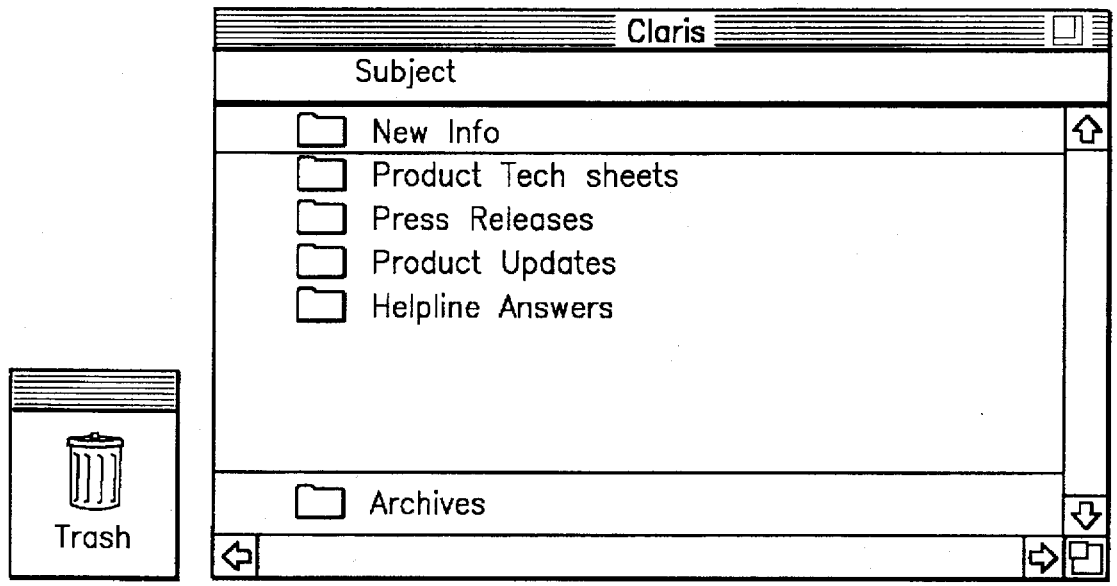
FIG. 2 is a diagram of a main folder display screen.

Referring to FIG. 2, the basic model for the user interface is assumed to be the Macintosh Finder. Upon launch the IP version of the electronic publishing tool presents the "root" of the publishers data. Folders have three separate regions: head, body, and foot. Any item can be placed in any region. The head and foot areas are special areas in which items can only be positioned manually, as opposed to the conventional body area in which items may be sorted. All of the head items will be displayed before the body items, and all of the body items will be displayed before the foot items. The Head and Foot areas allow publishers to easily create areas for documents that will not be moved when the folder is resorted, for example a "What's New" folder in the Head or an "Archives" folder in the Foot. As items are added to the Head and Foot, these areas grow to accommodate the added items.

Within folders, users can click to select items, click and drag to move items, or double click to open items. A manual sorting option allows selected item(s) in a folder to be dragged within the folder to reposition them. As in Finder, selected items can be dragged on top of a contained folder to move them to that folder and can be dragged to folders shown in another window. Unlike Finder, however, for user convenience, these drag operations are undoable.

Figure 3:
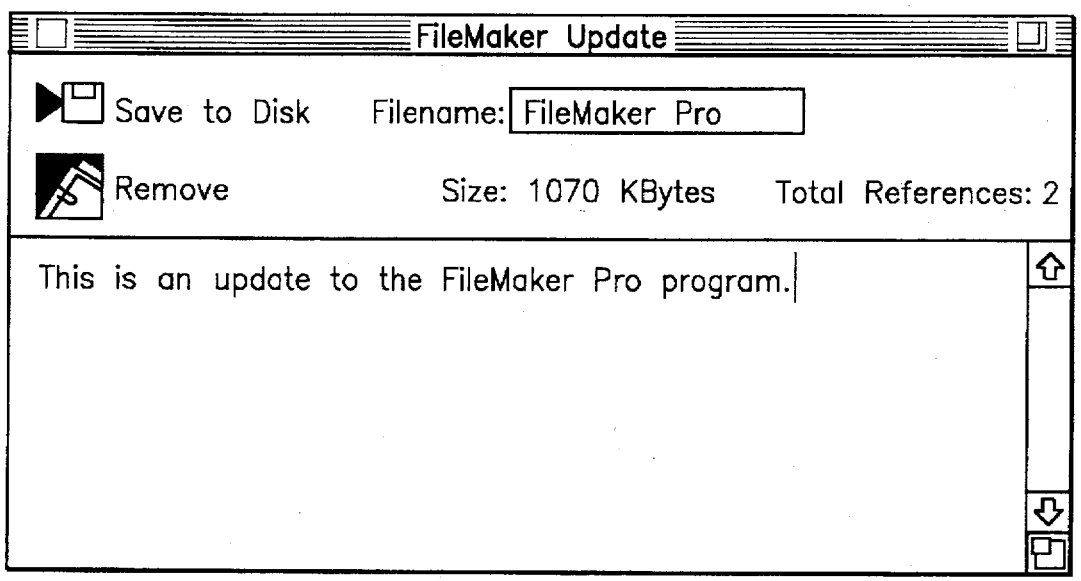
FIG. 3 is a diagram illustrating display of a text document with attached file.

Open documents appear as in FIG. 3. The document format supports "attachments," i.e. binary files that are transported without any changes being made to the data. A document may reference and be referenced by other documents. Therefore, at the top of the document window is information about any file which is attached, and about how many other references there are to that document. Buttons are displayed in the text document's window and are used to attach/detach a binary file to the text document or to extract an attached file (in a similar manner as in the known AppleLink application). The name of the file, which is also displayed at the top of the document window, is editable.

When the electronic publishing tool is launched, a menu bar is displayed. In the illustrated example, the menu bar contains a File Menu, an Edit Menu, and an Info Menu.

The File and Edit Menus provides various data manipulation capabilities, including creating new documents and folders, creating new links to existing objects, deleting objects (by dragging them to the electronic publishing tool trash folder, and then emptying the trash), moving objects between folders, positioning objects within a folder (head, body, and foot regions), attaching binary files to documents, and normal Macintosh text editing within a document (cut, copy, paste, etc.).

Figure 4:
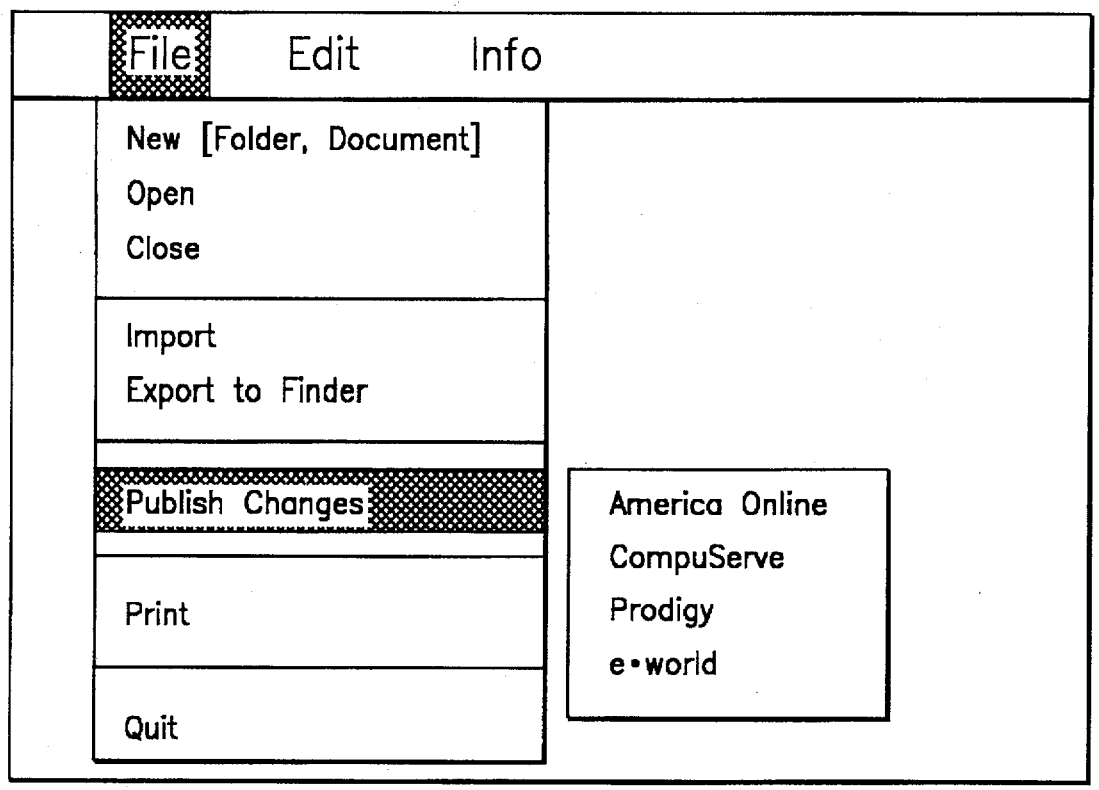
FIG. 4 is a diagram of a File menu display.

FIG. 4 shows the File Menu pulled down. Within the File Menu, a New [Folder, Document] command creates a new folder or document within an active open folder. For example a new text document might be created, at which time it is opened (FIG. 3). If a new document is closed and the user declines to save changes, the document is automatically removed from the folder.

An Open command opens a selected document, and a Close command closes the current window (except for the root window, which when active causes the Close command to be dimmed).

An Import command allows the user to select the source and type of a document the user wishes to import. The imported document will appear in the active folder.

In one embodiment, the electronic publishing tool will import the following external formats: Finder with XTND, BT-TEXT, Microsoft KnowledgeBase, and, in the case of the CS version, AppleLink CD.

The Finder with XTND format supports import of the Macintosh Finder hierarchy. Folders in the Finder are represented as folders in electronic publishing tool. All documents in formats supported by XTND are imported, provided the XTND translators are present. However, only the unstyled text from the body will be imported. All unknown formats or files with text larger than 32K are represented as attachments.

Whenever the Finder folder name matches the electronic publishing tool folder name, users are given the option of either forcing the electronic publishing tool folder to match the Finder folder (by adding new items, updating changed items, removing missing items) or to create a completely new electronic publishing tool folder with the current Finder folder contents.

If a file to be imported would have the same name as an existing file if the "dot extension" of the file to be imported were ignored, then the file will be imported as an attachment to the existing file. For example, if there is a file named "foo" and a file named "foo.b" is to be imported, then "foo.b" will be imported as an attachment to "foo".

The BT-TEXT format is currently used by AppleLink IPs to maintain their searchable databases. Hierarchy and enclosures are not supported in this format. Likewise in the Microsoft KnowledgeBase format, hierarchy and enclosures are not supported. The AppleLink CD format may be used with both the CS and IP versions of the electronic publishing tool. Hierarchy, text documents and enclosures are supported. Support for numerous other formats may be provided as desired.

When the Export to Finder command is selected, the current folder and all items under it are exported to the Finder. The export is incremental, based on a comparison of the electronic publishing tool modification time and the Finder modification time. In an incremental export operation, items in the electronic publishing tool hierarchy having the same name as items in an existing Finder hierarchy are exported only if the electronic publishing tool version has been modified since the Finder version. (Since the representation of documents in the electronic publishing tool is somewhat "richer" than the convention Finder representation, Finder export may not be 100% inverted with a Finder import, as some information may be lost.)

In the IP version, users select the Publish Changes command to indicate that all of the changes made since the last time Publish Changes was invoked should be readied for uploading to the central service. A synchronization folder is created with change information from the time of the previous synchronization (or since a new database was started) to the present. The electronic publishing tool asks the user where to put the synchronization folder. The synchronization folder may be dragged to the CS version's file server via an ARA connection.

At the central service, operations staff normally leaves the CS version of the electronic publishing tool in "Auto Publish" mode. In this mode, changes from IPs are scanned for continually and processed as they are found. (Manual synchronization of specific change folders is also possible.)

The Print command prints the active window's contents. The Quit command quits the application.

Figure 5:
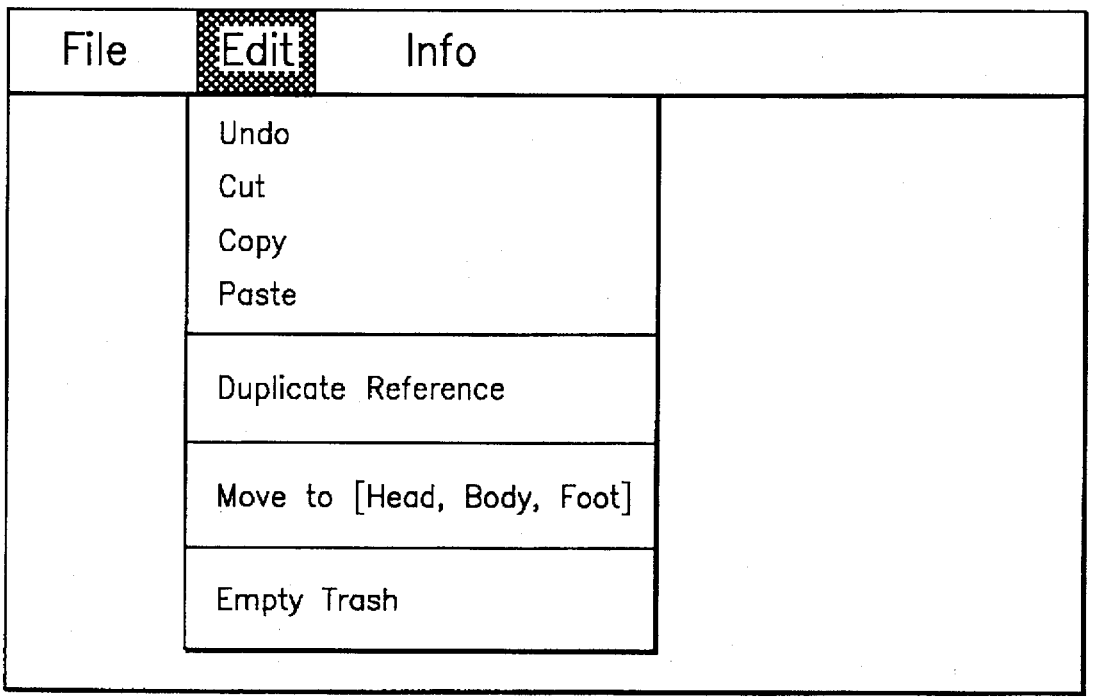
FIG. 5 is a diagram of an Edit menu display.

FIG. 5 shows the Edit Menu pulled down. Within the Edit Menu, standard cut/copy/paste/undo commands are provided for text editing. The Undo command undoes the last action, where applicable.

In a preferred embodiment of the electronic publishing tool, all items seen and manipulated by the user are references to those items rather than the item itself, which is stored and managed separately in a manner described in greater detail hereinafter. The Duplicate Reference command duplicates the references selected in the frontmost window. This command creates a new reference to the item—it does not duplicate the item (document or folder) pointed to. This new reference can then be dragged to another folder to set up double pointing.

The Move to [Head, Body, Foot] command moves the selected item(s) to the appropriate spot in the designated region.

Empty Trash permanently removes all contents of the trash folder, and Move to Trash moves the selected item to the trash folder. The trash can is a window representing the electronic publishing tool's own trash can (FIG. 2). It operates much as the regular Finder trash, but only on electronic publishing tool objects. A user deletes items by dragging them to the trash. A user empties the trash by selecting Empty Trash from the Edit menu. The trash can be opened like any folder and items dragged back out of the trash to any other folder.

An item may be an object itself or merely a reference to an object. If an object has more than one reference to it, then deleting a reference deletes only that reference. When the last reference is placed in the trash, and when the trash is emptied, then the object referred to will be permanently removed from memory.

Figure 6:
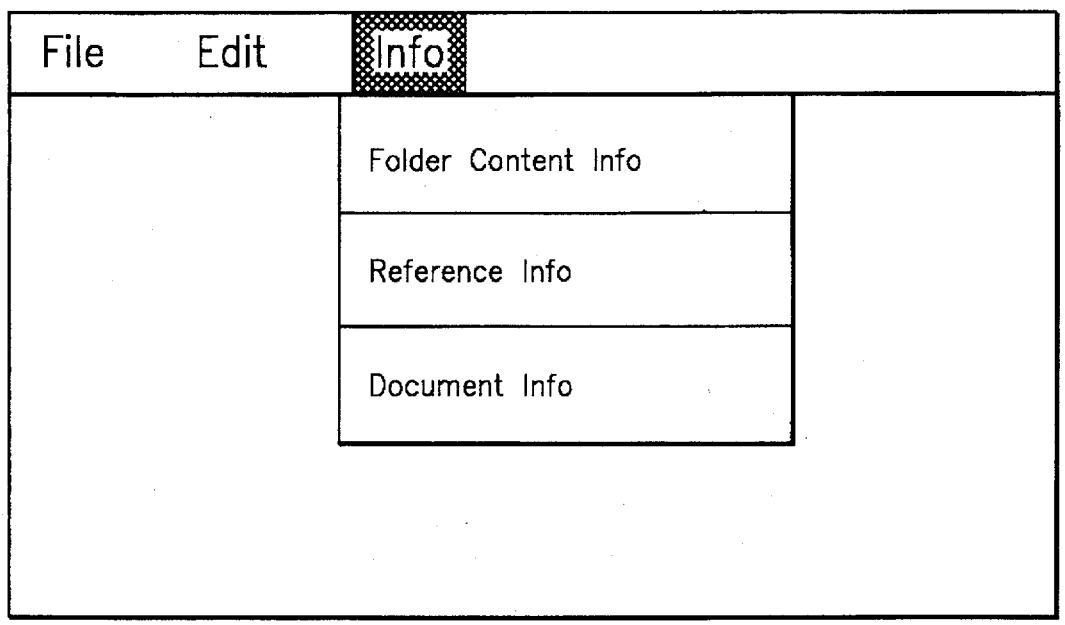
FIG. 6 is a diagram of an Info menu display.

The Info Menu relates specifically to publishing kinds of operations. Referring to FIG. 6, the Into Menu contains a Folder Content Info command, a Reference Info command, and a Document Info command.

Figure 7:
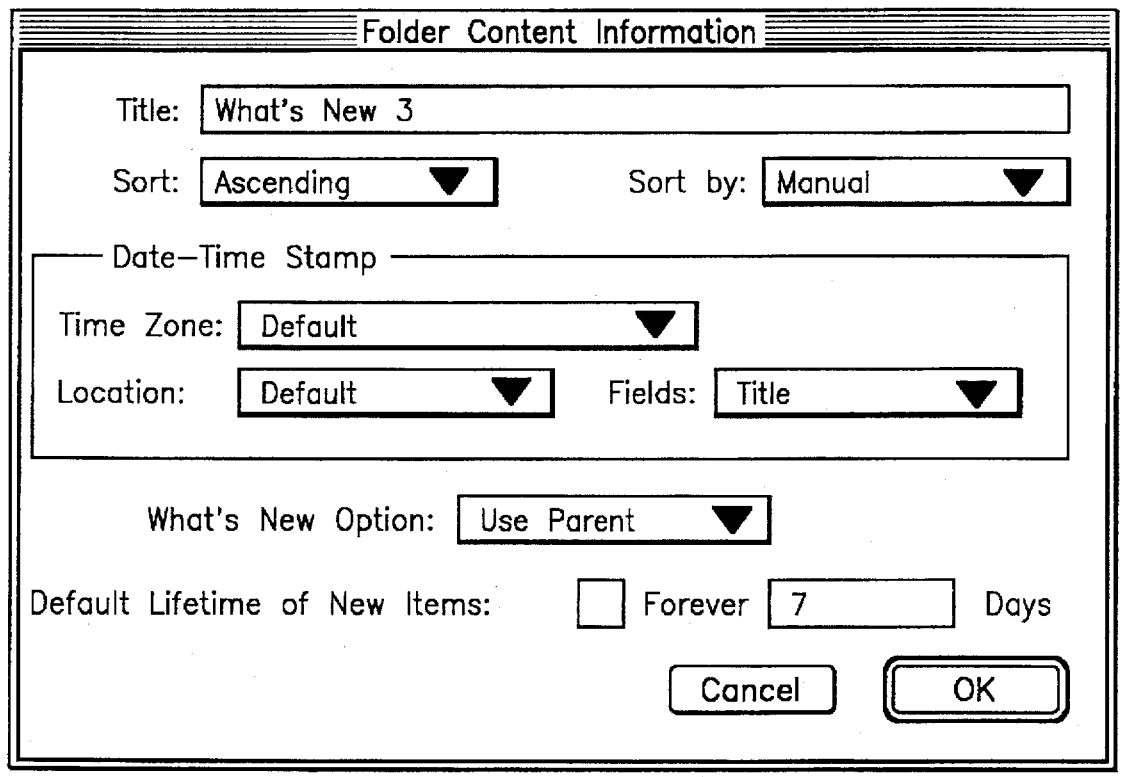
FIG. 7 is a diagram of a Folder Content Info dialog box.

The Folder Content Info command brings up a Folder Content dialog box, illustrated in FIG. 7. This dialog allows a user to set the folder title, sort order, title string generation, and default number of days that new references should have until they expire. The dialog applies to the active window if the window displays a folder and none of the items are selected. It applies to the selected item if that item is a folder. Otherwise it is unavailable.

The Folder Content dialog box is also used to set a "What's New" mode and to set an "owning IP."

New or changed documents can automatically have an additional reference in a folder that represents new information. Each folder can be set to have its own What's New folder, to use all parent's What's New folders, in which case What's New processing follows the mode of each parent folder with changes being filtered up the hierarchy, or to not participate in What's New processing. In an alternative embodiment, the mode of What's New processing, rather than being a user option, may be determined by the central service.

Because the central service and the IP sites are not in continuous communication, it is important to ensure that only one site modifies any particular object. Objects are designated as belonging to a particular IP, and an object can only be modified at that IP's site. (The central service is itself considered an IP.) At an IP site, objects are automatically assigned to belong to that IP. At the central service, objects initially belong to the central service but can be assigned to other IPs. For example, the process of setting up a new IP normally involves making some folders and assigning them to the new IP. Objects are locked against modification once they have been assigned to an IP. The exception is that the IP field can be changed up until the time that the information is sent to an IP.

Figure 8:
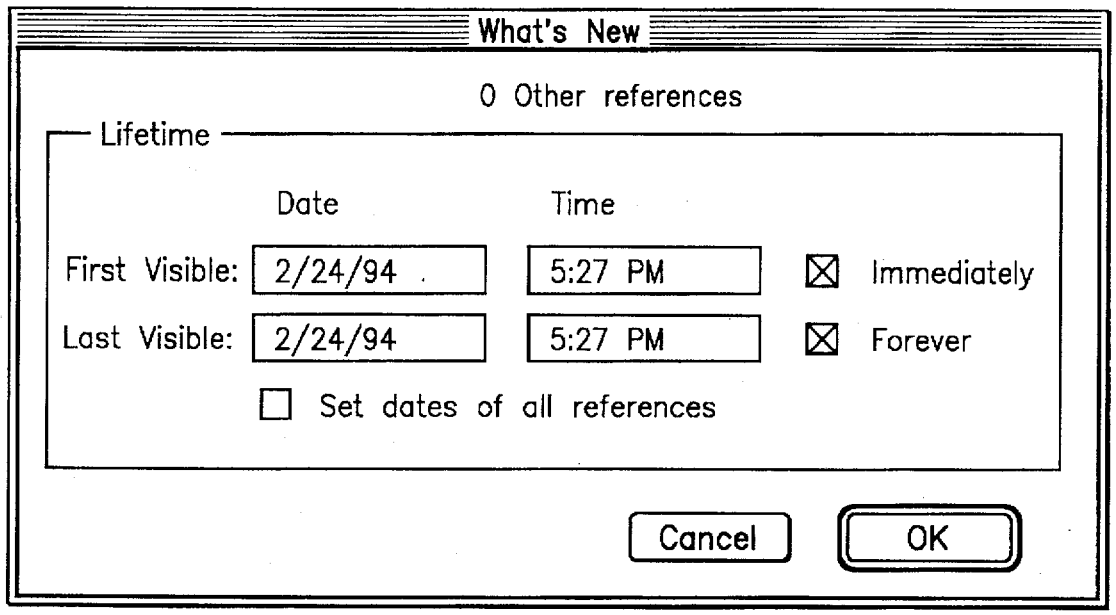
FIG. 8 is a diagram of a Reference Info dialog box.
Figure 9:
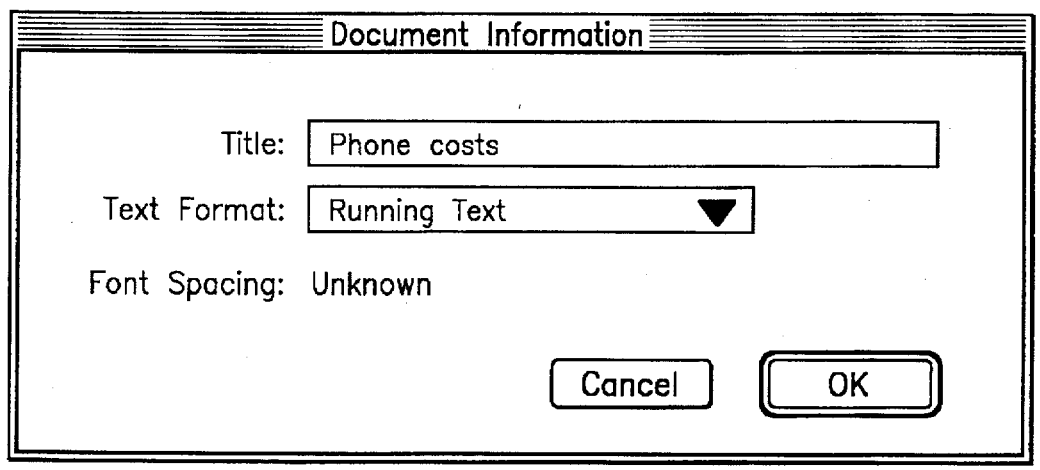
FIG. 9 is a diagram of a Document Info dialog box.
Figure 11:
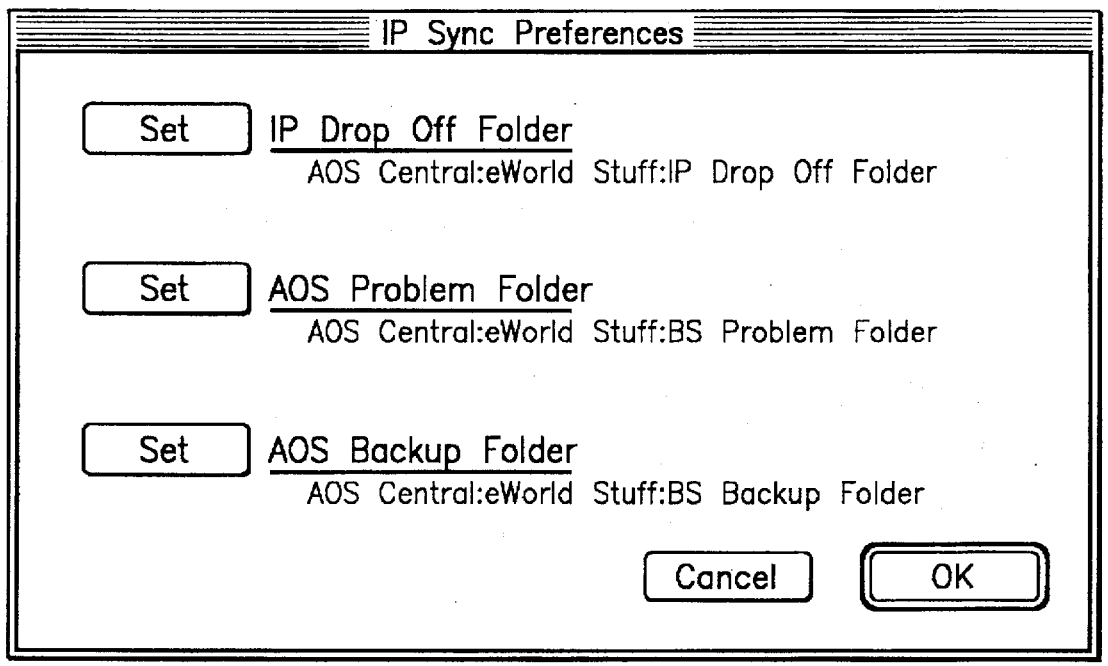
FIG. 11 is a diagram of an Idle Sync Preferences dialog box.

Referring to FIG. 8, the Reference Info command brings up the Reference Info dialog. This dialog allows a user to set the "lifetime" of a selected reference, and if the user desires, the lifetime of all other references to the same document. Information relating to publication to an online or other service, including the upload status and host ID, is shown in the central version of the application.

The Document Info command brings up a dialog box that affects the selected text document itself. It applies to the active window if the window shows a text document, or the selected item in a folder if the item is a text document. Otherwise it is unavailable. This dialog allows a user to set the document's title, and whether or not returns are added at the end of lines within the document.

Menu options for the CS version of the electronic publishing tool are somewhat different than those for the IP version, providing added functionality for central version.

One of the principal functions of the electronic publishing tool is to export content to an online service or other service. Export is supported by creating a scripting language source file, such as an RMP source file, and other supporting files. Export will typically involve exporting all changes read in since the last export to the online service or other service.

Figure 12:
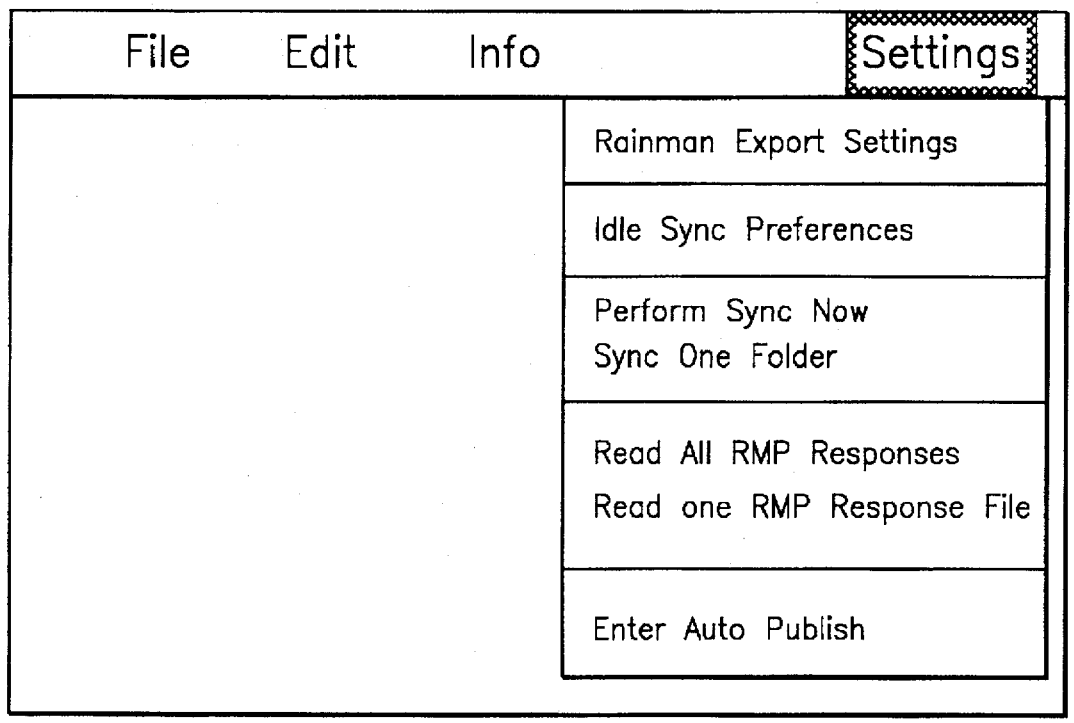
FIG. 12 is a diagram of an Settings menu display available in a central version of the electronic publishing tool.

Referring to FIG. 12, in the central version, a Settings menu is used to set folders used for IP synchronization and to set folders and parameters used to upload information to an online service or other service. The Settings menu will have separate export settings commands for each such service. For simplicity, only one such command is illusutrated, a Rainman Export Settings command that lets the user set the Finder folders which are used for saving RMP export in, where RMP responses will be found, where RMP problems should be written, and where RMP backups should be stored. The bottom half of the dialog allows the user to set up the mainframe computer parameters needed for uploading Rainman Plus files.

An Idle Sync Preferences command brings up a dialog which lets the user set the Finder folders to watch for incoming work, where to copy work in progress, and where to put problems. Some additional commands are available only if idle sync preferences have been set. These include a Perform Sync Now command and a Read all RMP Responses command. Perform Sync Now forces a sync now, rather than waiting for a specified idle time. Read all RMP Responses forces reading responses now, rather than waiting for a specified idle time.

Other commands are used to manually select and process one folder or file. Sync one Folder is used to manually select and process one folder (created by a previous Publish Changes command). Read one RMP Response File is used to manually select and process one response file.

As previously described, in Auto Publish mode, synch and response reading is done in background. This mode is the normal unattended mode for operation. An Enter Auto Publish command closes and saves open windows, then puts up a status dialog box and enters a mode wherein the only user options are to Exit Auto Publish or request an Emergency Exit from the dialog box.

Emergency Exit is only available when in Auto Publish mode and is intended to stop inside an autopublish task. In some instance, it may not be possible to correctly restart the autopublish operation. Therefore, normally an Exit Auto Publish button provided on the dialog that shows during auto publish mode is used. This button requests an exit after the current task (if any).

In the CS version, a new database can be generated from the central service's master database that contains information relevant to a specific IP. This ability is intended for use in two situations: setting up a new IP, and providing a replacement database to an IP who has lost data. The following user scenarios will provide a greater understanding of how the present electronic publishing to may be used to set up a new IP, update an IP, or enable recovery of an IP.

At the central service, in order to set up a new IP, a New IP menu is selected and information is entered into the New IP dialog. Next, the top-level folders are created within the CS version hierarchy to represent the collections that an IP will manage. These new folders are transferred to the IP by using the Folder Info dialog and selecting the Set Owner button, then selecting the new IP. The folders are designated for delivery to the IP, and are visible in the IP's root folder view as well. The folders immediately become locked against further changes. (The exception is that the owner can be changed until the contents are actually sent to the IP.)

When the necessary folders are built, an IP Info menu is selected and the new IP is selected from the IP list. An Export Entire IP Database button is used to produce a seed database for that IP. The data folder that is created is sent to the IP, who can immediately begin adding content.

If after seeding an IP, a new top-level folder for that IP is needed, the folder is created at the central service in the CS version hierarchy. As before, the owning IP is changed to the desired IP. When all the new folders have been built, they are written out using the IP Info dialog, selecting the IP, and using an Export New Top Level Folder button. This does not produce an entire database, but only the new top level folders. This data folder is given to the IP who reads in the information on the new folder.

If an IP loses its data, and its backup is older than the state of the database when they last sent changes to the central service, then it must be given a new database from the central service. The same command used to write the initial IP database (IP Info dialog and the Export Entire Database button) will produce a new database containing all content relevant to the selected IP. This database is given to the IP, who can immediately begin to use it.

In a preferred implementation of the electronic publishing tool, programmatic entities are, with few exceptions, objects consisting in logical terms of a state portion and a portion containing a method, or collection of methods, that respond to messages from other objects (or possibly the same object) to operate upon data within the state portion. In this sense, all of the entities are "active." The entities may be broadly divided, however, into entities that manage other entities and entities that are managed by other entities. Primary responsibility for the overall management of program entities lies with an Object manager ("ObjectMan.")

Figure 13:
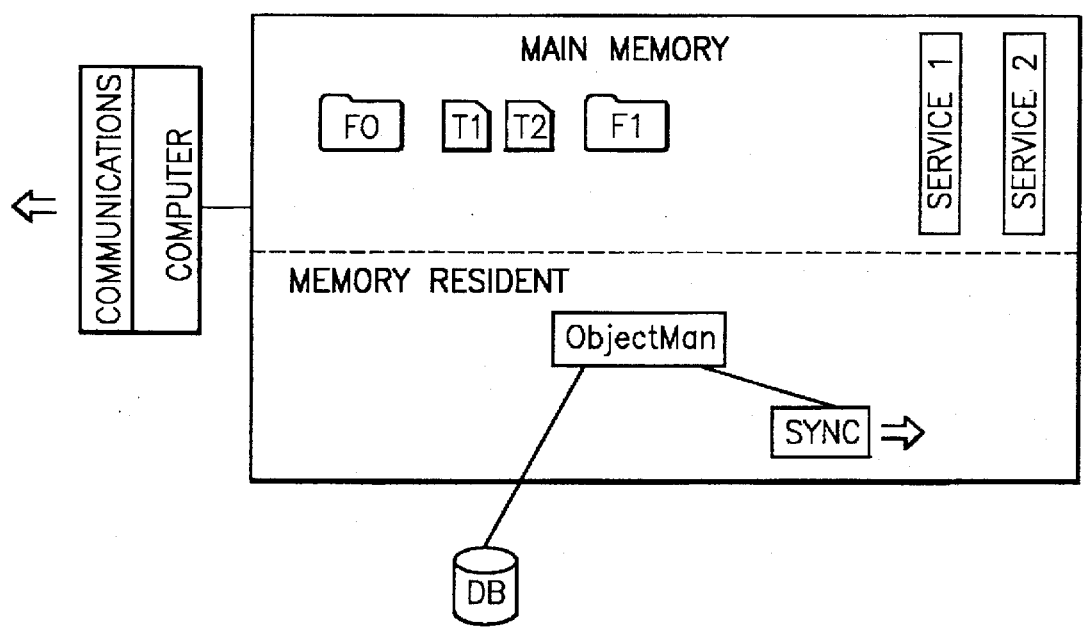
FIG. 13 is a block diagram of the electronic publishing tool of FIG. 1.

Referring to FIG. 13, ObjectMan interfaces with a conventional database system (for example, C Index Pro, available from Trio Systems) to save objects to the database from main memory and restore them to main memory from the database. ObjectMan is therefore responsible for in-memory usage of other objects. Those objects may be of various classes including, as illustrated in FIG. 13, folder objects, text document (TDoc) objects, service objects and service information (SI) objects. Folder objects and text document objects correspond generally to conventional folders and text documents, respectively, and are representative of "content objects," i.e., objects that represent information in a form that allows that information to be presented to a subscriber in some fashion.

Folders, text documents, and other content objects represent content generically, that is, without regard for which service or services, if any, the objects have been designated for publishing on. Service-specific information is represented in service information objects associated with the genetic content objects. Service objects, on the other hand, used to translate a genetic object and an appropriate service information object into a file or set of files suitable for electronic publishing on a particular platform. A service object might be a Rainman Pro (RMP) service object that produces output suitable for electronic publishing on e•World, for example. Another service object might be a Prodigy service object.

Besides being responsible for the in-memory usage of objects, ObjectMan is also responsible for managing the persistent lifetimes of objects. In other words, given a potential community of entities "interested in" a particular object, including perhaps one or more objects at an IP site, one or more objects at the central service, and one or more service objects, ObjectMan determines when the particular object has outlived its usefulness and may be safely deleted from the database entirely.

Finally, ObjectMan is responsible for receiving broadcast change/synchronization notices from objects and relaying those notices to objects interested in those objects. Each object receiving a broadcast change/synchronization notice is responsible for determining how it will respond to such notices. One possible response is, if the object receiving the notice is a remote copy of the object sending the notice, to "play back" the changes made to the object sending the notice so as to synchronize with that object. Another possible response might be to simply update a variable. For example, a folder F1 might contain and express interest in a folder F0. The folder F1 might further maintain a count of the total number of items contained within it and its folders. If a document were newly inserted in F0, then a broadcast change/synchronization notice would be sent to F1. In response to the notice, F1 would update its count to reflect the newly-added document.

The importance of, in effect, moving synchronization policies from the database engine to the objects themselves, is that the objects themselves are "in the best position to know" the best way of handling a change notice. With replicas of the same object located at different sites, different changes may be made at different times to the same object. For example, an IP may change the title of an item, causing a broadcast change/synchronization notice to be sent to the central service. Some time earlier, the central service may have also changed the title to something slightly different. The question then arises, which change is to be honored? One possible policy is to honor the change that is last in time. However, this policy does not produce satisfactory results in all situations. By moving synchronization policies to the objects themselves, great flexibility is achieved in synchronizing objects.

The following description will present internal details of ObjectMan sufficient to enable one of ordinary skill in the art to make and use the same as part of the present electronic publishing tool.

ObjectMan is the persistent object store used in the electronic publishing tool. Its main purpose is to store and retrieve objects on demand. It is also responsible for transporting changes to remote machines.

Persistent objects form the basis of the electronic publishing tool. Persistent objects are objects that are managed by ObjectMan and are saved on disk in a database. As will be described more fully hereinafter in relation to FIG. 14, they are all descended from a base class Document: and are identified by an object identifier, or OID, a globally unique ID which is permanently associated with the object. Other objects can refer to a persistent object by its OID until the object is actually required in memory.

ObjectMan performs a number of general services for non-persistent objects as well as specific services for persistent objects. ObjectMan also performs certain remote service. Each of these will be described in turn.

The general services performed by Object Man include generating globally unique IDs for generic use. Object Man also provides the ability to access a specified object, and the ability to iterate through an object's interested parties. A further important general service performed by Object Man is the broadcasting of changes to objects that have registered an interest in a persistent object.

Non-persistent objects may, for example, access Object Man to retrieve persistent objects. In an exemplary embodiment, ObjectMan is accessed through an accessor TheOM. If an ObjectMan object does not currently exist, a new one will be made and returned. Each copy of the electronic publishing tool has only one ObjectMan object, which is not freed until the application quits.

In an exemplary embodiment, ObjectMan provides two spaces of globally unique IDs, OIDs to identify persistent objects and UniqueIDs for general use. The two need not be compatible with each other.

OIDs are only used to identify persistent objects. An OID remains permanently associated with a persistent object and is never reused, even if the object is deleted from the database. Objects can use OIDs to refer to persistent objects without actually having a copy of the persistent object in memory. New OIDs are only assigned to persistent objects and, preferably, are not used in any other way.

UniqueIDs are a set of globally unique IDs which can be used for whatever purpose an object desires. In an exemplary embodiment, they are more "lightweight" than OIDs. A new UniqueID may be obtained from ObjectMan by calling GetNewUniqueID.

Objects can retrieve persistent objects registered with ObjectMan by calling GetObject. GetObject returns the object instantiated in memory. Preferably, only one copy of the object is allowed to exist in memory at any one time. Therefore, if the object is already in memory, that copy will be returned, otherwise the object will be restored from the database. A failure is signaled if the object is not stored in the local database. A usage count for the object is incremented when the object is returned. A non-zero usage count tags the object as being in use. Once an object is finished with a persistent object, it calls DoneWithObject. This causes the usage count for the object to be decremented, allowing ObjectMan to free the object from memory when it has determined that no object needs it in memory anymore.

ObjectMan is responsible for automatically deleting registered persistent objects from memory and from the database. Persistent objects are guaranteed not to be deleted from memory if the usage count is positive. The usage count is incremented on calls to GetObject and is decremented on calls to DoneWithObject. Once the usage count is zero, ObjectMan may delete the object at any time it determines more memory is needed, but objects are usually cached in memory for as long as possible. Since ObjectMan takes care of deleting the object from memory, the conventional Free method of MacApp is not used on the object.

Documents are guaranteed not to be deleted from the database if there is at least one document interested in it. If a document needs to be permanently persistent, it may register interest in itself.

A General Function Reference providing further details of the general functions of ObjectMan is attached as Appendix A.

ObjectMan provides various services for persistent objects, including automatic retrieval of an object, automatic deletion of an object from memory when other objects are done with it, automatic deletion of an object from the database when no other objects are interested in it, and delivery and synchronization of changes to a remote site.

Persistent objects have the ability to store data persistently in the ObjectMan database and can be automatically retrieved on request. Persistent objects (i.e., the objects stored in ObjectMan) interact with ObjectMan by making calls to it at certain times. In return, ObjectMan guarantees to make certain calls to the objects at specific times.

All persistent objects descend from a class Document. An object of the class Document is responsible for the saving and restoring of any associated auxiliary object whose state needs to be saved. Objects of the class Document preferably have an ObjectManInfo field. This class is used by Object-Man to store data with the object in memory. ObjectMan calls the Save and Restore methods on the field during its save and restore operations.

A persistent object is identified by its OID, a globally unique ID that is permanently attached to the object. Objects can refer to persistent objects by their OID and use the object retrieval function when they need the persistent object itself. OIDs are never reused. ObjectMan keeps a running count of calls to retrieve a persistent object to determine when it can delete the object from memory. If the usage count is not positive, ObjectMan may delete the object from memory as needed. A subsequent request for a deleted object will cause the object to be restored from the database.

When ObjectMan thinks it can delete an object from memory, it will first call a ReadyToFree method of the object. If this function returns false, ObjectMan will not free the document. Furthermore, if ObjectMan deletes a persistent object from memory, it will call the object's AboutToFree method before actually freeing the object. This allows the object to do any last minute cleanup or saving. When objects are deleted from memory, they call FreeingObject to allow ObjectMan to update internal information. This measure prevents an object from being inadvertently deleted by someone or something other than ObjectMan.

Persistent objects can register interest in other persistent objects, including themselves. Registering interest in an object allows the registered object to receive any change notices generated by the object. Persistent objects should broadcast change notices to announce any significant change in its data or state. This allows other objects who have registered an interest to know when relevant data has changed.

Objects can be deleted from the database by ObjectMan any time there is no one interested in it and it can be deleted from memory. Objects in the database that have no interested proxies are considered orphans. If desired ObjectMan may be designed to allow the user to search for orphans in the database. In an exemplary embodiment, the criteria for the deletion of an object from the database are: 1) No interested parties; 2) No interested views; 3) Usage count less than one; and 4) No change notices referring to the object.

Documents register themselves with ObjectMan in order to be considered persistent. In an exemplary embodiment, a call SetDocOID is used to register a document with Object-Man. The document is assigned an OID at this time, and the usage count is set to one. Preferably, this function call is made during the object's initialization. Objects only register themselves with ObjectMan once. At the end of the initialization sequence, objects call a function NewInitializedObject to allow ObjectMan the ability to process the newly initialized document. This saves the object to the database, but internal document flags remain set as the document wishes.

In an exemplary embodiment, ObjectMan supports multiple partitions for a document. A partition is entirely saved and restored as a unit. Data across partitions, however, can be saved and restored separately. An object must have at least one partition, but may use multiple partitions in order to save and restore certain information independently. Typically, an object will have a system partition and a user partition.

Persistent objects are intended know that they need to be saved and to decide when to save themselves. In an exemplary embodiment, objects call SaveObject to save the entire object or just one partition of the object. If kAllPartitions is passed in, all partitions of the document will be saved in order.

If an object is requested through GetObject and the object is not already in memory, it is automatically restored into memory by ObjectMan. During restoration, an instance of the object's class is made, and a Restore method of the object is called (not the class's initialization method, I<class>). During normal initialization, the I<class>method of an object will be invoked. During a restoration from the database, however, the object's Restore method will be called instead of the I<class>method. The Restore method does whatever initialization the I<class>method would have normally done. The I<class>method is called only the first time the object is created.

If an object needs to manually restore a partition, it can call the RestoreObject function. If kAllPartitions is passed in, all partitions associated with the object will be restored in ascending order.

An object saves and restores its data from the database using save and restore handlers. ObjectMan passes these handlers into the Save and Restore functions of the persistent objects. The handlers treat the data as a stream of bits. Objects make calls to these handlers to read or write data, and read back the same amount of bytes that was saved. The handlers provide save calls for the more common data types.

A Persistent Objects Function Reference providing further details of the persistent object functions of ObjectMan is attached as Appendix B.

ObjectMan may be designed to support either limited remote object capabilities or more extensive remote object capabilities. In an exemplary embodiment, ObjectMan initiates transportation of change notices to remote machines, transportation of new persistent objects to remote machines, and transportation of external files to remote machines.

Objects are expected to broadcast any significant changes that happen to them so other objects can know that they have changed. These change notices are sent by ObjectMan to all objects that have registered an interest in the broadcasting object.

Some objects, called views, are concerned primarily with displaying information to the user. Views register interests in the document they are presenting to receive change notices. A function AddInterestedView is called to allow a view to begin receiving change notices that are broadcasted. ReraoveInterestedView removes the view from the list. This function is called when the view no long wants to receive change notices (typically when the view is freed). The interested parties mechanism allows persistent objects to register interests in other persistent objects to receive all changes that are broadcasted by that object. Different Interest Types may be defined, in which case Interest Type is indicated at registration time. In an exemplary embodiment, two types of interests are defined and are indicated using the following constants: kGenericInterest, and kContainerInterest. These interest types are used by an iterator of ObjectMan that iterates through the interested parties of an object. When a change that is deemed significant happens to a persistent object, the object broadcasts a change notice to inform other interested objects. Change notices descend from a class Change. The change notice itself is intended to contain all the information about the change, since the source object is not guaranteed to be activated in memory when the change notice is delivered to interested objects. For example, a change notice announcing a title change would also contain the new rifle. Subclasses of Change are used to support custom information needed for a change notice. New subclasses are registered in a list of change notice classes.

Different types of broadcast modes are used depending on whether a change has already been committed to and whether the change is to be published at the particular time in question. In an exemplary embodiment, there are four types of broadcast modes, indicated using the following constants: kPreflight, kInterestedThings, kSync, and kInterestedThingsAndSync.

The kPreflight mode is used to "preflight" changes, informing other objects that the action is not actually performed yet, but soon will be. If receiving objects think there is a problem with the impending change, they return back an error code and add their error to an error list. The object might decide to perform the action anyway.

The kInterestedThings mode tells interested objects that the change has just taken place. The kSync mode sends the change notice to remote copies of the source object only. The change notices sent with this mode usually contain data private to the object itself. ThekInterestedThingsAndSync mode is a combination of the kInterestedThings and the kSync mode. It sends the change notice to both local interested objects and to the remote copy of the source object.

A function BroadcastChange is called to send change notices to objects that have registered an interest in the persistent object. One call takes the individual parameters related to changes and builds the Change object, but only the generic Change class. Another call takes a Change object itself. This variant is used when the change notice is a subclasses of change. The BroadcastChange call transfers lifetime management of the change object to ObjectMan, which may delete the change object at any time.

Preflight change notices are sent to all objects immediately. In the case of messages labeled kInterestedThings or kInterestedThingsAndSync, interested views receive the change notices when the document partition is saved. That is, the change notices for a particular document partition are queued until the partition is saved. Only after the save are the change notices sent to the interested parties.

ObjectMan calls a ChangeOccured method of each object that has registered interest in the source object. Objects process any relevant change notices in their ChangeOccured method and return an appropriate error result.

Every change notice regardless of type is sent to an AutoBroadcast function of the electronic publishing tool application. The application sends the change notice to those objects which have registered themselves to automatically receive change notices.

An Interested Things and Changes Function Reference providing further details of functions relating to the interested parties mechanism of ObjectMan is attached as Appendix C.

Machines running the electronic publishing tool communicate in a tree structure, with data flowing up the tree. The data from all subsidiary machines is entirely replicated on the master machine. ObjectMan sends new objects, change notices, and binary files to remote machines.

In an exemplary embodiment, ObjectMan assumes that all data and changes originating at a machine will flow upwards. It does not distinguish between data that is actually published on the online system and data that is not meant to be published.

The mechanism that causes changes to an object to be duplicated on another machine running the electronic publishing tool is the mechanism of change notices generated by persistent objects. ObjectMan keeps a copy of all "primary" change notices and transports them to the remote machine, where they are played back. Primary change notices are those which do not originate as a direct result of another change notice. Change notices generated during the playback process are not saved for playback on other machines.

New persistent objects are also transported to remote machines. ObjectMan sends the state of all new persistent objects as seen when the NewInitializedObject call for that object is made. Any changes that happen to the object after its I<class>method is called must be sent through a change notice. The object is guaranteed to exist in the remote database by the time the first change notice that refers to it is processed.

ObjectMan also transports binary files that have been registered to remote machines. A Files Reference providing further details of the file functions of ObjectMan is attached as Appendix D.

During the processing of change notices from another machine, ObjectMan calls the method PlaybackChange on the source object of each change notice. The PlaybackChange function of each object changes its internal data to duplicate the action and broadcast any change notices necessary to inform other objects of the change that took place.

A Remote Function Reference providing further details of the remote functions of ObjectMan is attached as Appendix E.

In interacting with the remainder of the electronic publishing tool application, ObjectMan must be gracefully closed and freed and it must be allowed to grab idle time.

ObjectMan installs cohandlers to grab idle processing time. The application must call the cohandlers every so often to allow the idle processes to work. ObjectMan assumes that it is running under the MacApp 3.0.x environment. It assumes that it can install cohandlers, pieces of code that are called periodically to perform particular operations.

During start-up, since ObjectMan permanently allocates chunks of memory for its use, it should be initialized early in the start-up process. To ensure that ObjectMan has been initialized, the application calls ObjectMan's accessor during its initialization. If ObjectMan signals an error, the application quits, since all ObjectMan calls rely on successful initialization.

When the application quits, it calls the Close function to allow ObjectMan to do some cleanup. This function is called after all the persistent objects have saved themselves (since it will delete all of them from memory) and before deleting the MacApp cohandler chain (since ObjectMan relies on a cohandler).

The application calls a static function FreeIfNecessary to free ObjectMan. The FreeIfNecessary call allows the application to gracefully quit if an error occurs during the initialization of ObjectMan. (Without this call, the application would have to call the ObjectMan accessor at quit time, which would incorrectly try to create a new ObjectMan object.)

ObjectMan provides the application the means to store a specila OID which is persistent through invocations of the application. This OID is used to bootstrap the application, allowing it to access a document containing data it needs to save. The application normally makes one call to SetSpecialOID the first time the application is invoked. The object corresponding to the saved special OID is used to preference data and any other data the application needs to store persistently. In subsequent invocations, the application gets the special OID and uses the data stored there for start-up purposes.

A Function Reference providing further details of the application interaction functions of ObjectMan is attached as Appendix F.

Objects that are managed by ObjectMan, or are saved as part of an object that is managed by ObjectMan, are generally content objects. These objects provide a variety of services, such as persistence. Content objects are the objects IPs and the central service operations staff create and manage. Many content objects correspond directly to pieces of information that will be seen by an end user once published onto a host, such as e*World. Other content objects provide a supporting role, representing entities such as an IP, and are only used within the electronic publishing tool administratively.

From an application-building perspective, content objects are the 'documents' in a MacApp-based application, and are sometimes referred to as documents. Unlike most applications however, including MacApp-based applications, the electronic publishing tool is made up of many different document types, with differing behaviors in areas such as when (or whether) a document must be explicitly saved by a user.

Because the electronic publishing tool is designed to publish content to multiple platforms, there must be a separation between what information is kept generically, and what information is only used to support publishing on a particular platform. Within the electronic publishing tool, a particular publishing platform is referred to as a service, and service-specific objects are used to support the information needed for a particular content object on a particular service. Ideally, all of the content is part of the generic object, while the service-specific objects are used mainly to support the publishing process for that platform, such as the service's local ID for an object, or its upload status. A protocol is provided for associating service-specific objects with the generic object.

The foregoing description has presented internal details of ObjectMan sufficient to enable one of ordinary skill in the art to make and use the same as part of the present electronic publishing tool. The following description will present internal details of content objects—the objects managed by ObjectMan—which when, coupled with the previous description, are sufficient to enable one of ordinary skill in the art to make and use the present electronic publishing tool.

Figure 14:
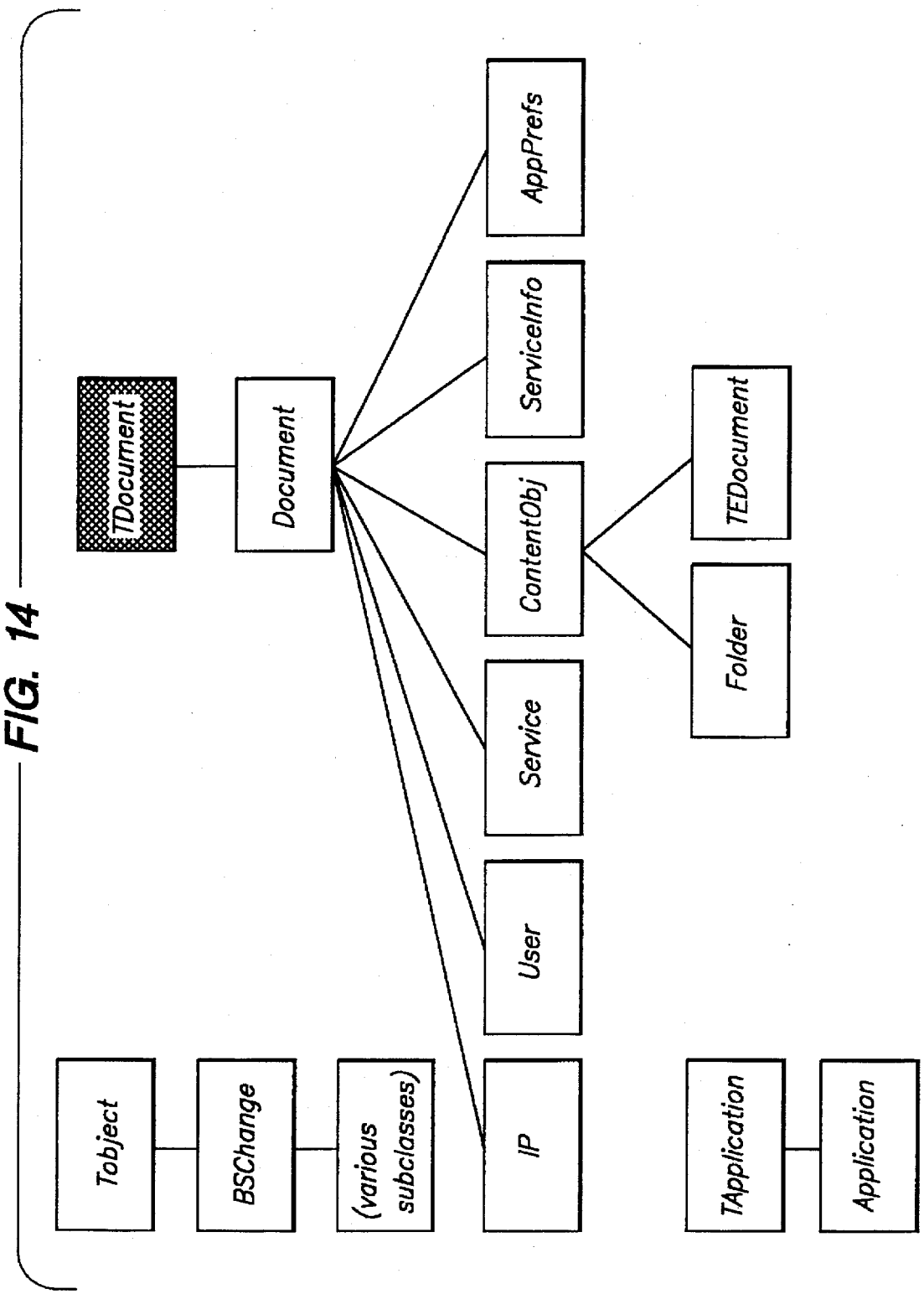
FIG. 14 is a class hierarchy diagram of the electronic publishing tool of FIG. 13.

Referring to FIG. 14, showing an inheritance hierarchy, or class hierarchy, of the principal objects (apart from ObjectMan) that make up the present electronic publishing tool, most of the objects are descended from a class TDocument, shaded to indicated that it is taken directly from MacApp. A subclass Document inherits methods (essentially a collection of procedures) from TDocument. When a subclass is defined, it may be defined so as to inherit all of the methods of the parent class unchanged, to inherit some of the methods of the parent class and to override other methods by providing alternative methods, or to override all of the parent class's methods. In the case of Document, many of the methods of TDocument are not overridden, but many others of the methods of TDocument are overridden. In particular, most of the TDocument methods that a subclass normally overrides have already been overridden by Document.

In an exemplary embodiment, the classes of the present electronic publishing tool are defined in the C++ programming language. However, other programming languages may be used.

Class Document is the base class for most of the content-related classes in the electronic publishing tool. A Document is persistent and synchronizable with other machines. It maintains interest in other objects, and receives notifications of significant changes from those objects. It can also be the subject of interests. Documents maintain some basic properties, such as modification date.

Documents are intended to represent content generically, across all possible publishing platforms. For information specific to a platform, such as a host ID, a ServiceInfo subclass is provided, descended from Document. There will typically be one ServiceInfo subclass for each Document; subclass, for each publishing platform.

All of the information in an object of the base classDocument; is saved in the system partition. All Documents register with an autosaver so that this partition is saved frequently.

ContentObj is a subclass of Document. It represents the subset of Documents that directly represent content objects, such as folders of documents, that an IP can create and that users will see. As compared to Document, the main added functionality is support for binary attachments. The binary attachment information is saved in the user partition, and must be explicitly saved by the user (along with the rest of the user partition information).

Class Folder is a subclass of ContentObj and is typed to hold objects of class ContentObj. A Folder therefore manages a set of other content objects, providing operations to add, remove, and reposition objects. It also provides several options for sorting the contents. As with many of the classes found in the present electronic publishing tool, Folder may be used directly or may be further subclassed by users as they develop different types of content objects. In this way, the electronic publishing tool becomes extremely versatile and extensible.

In an exemplary embodiment, Folder (along with its view hierarchy) mimics several aspects of the Macintosh Finder user interface. In particular, like Finder folders, users never explicitly save a Folder. All of the information relating to a Folder's contents is stored in the system partition and saved in background.

Class TEDocument is used to represent text documents. It is a subclass of Document. Apart from some new methods specific to the electronic publishing tool, it operates in substantially the same way as the sample TTEDocument class provided with MacApp. A text document includes the following attributes, some of which an IP may set and/or view: rifle, owning IP (read only), first displayed date, expiration date, modification date (read only), text size ($\leq 32K$), text format (running text, line breaks), mainframe computer status (CS version, read only), and total number of links to the document (read only).

The electronic publishing tool provides an explicit representation of the Information Providers and individual users who use it. Class IP represents information providers. Each IP has associated with it a list of User objects and a root folder for that IP. All of the content managed by an IP is contained, directly or indirectly, from the IP's root folder.

Typically, an IP version of the electronic publishing tool has just one IP object, and thus one root folder in which all of the IP's content is contained. The CS version typically has many IP instances. One represents the central service itself, and the others represent all the other IPs publishing to the central service. Only content accessible via the central service IP root folder is published.

Service and Transport are the base classes for the publishing process. They each have subclasses (not shown) each of which dedicated to a particular service (e.g., America Online, Prodigy). Service represents a host to which content needs to be published, and Transport represents a particular mechanism for encoding and transmitting the content. They are subclasses of Document to take advantage of persistence. Services are identified by a constant associated with a particular service, for example kAladdinService for e•World.

Class ServiceInfo is the base class for the service-specific objects that can be associated with each Document. ServiceInfo objects are obtained by asking a Document for the ServiceInfo object associated with a particular service type.

Application is a subclass ofMacApp's TApplication, which provides methods for launching an application, quitting an application, etc. Besides start-up and shut-down, Application provides methods to create a Document and its view. It also implements user interface rules (for example, one opened window per document, etc.).

Because Application is not a subclass of Document, Application is not persistent, cannot send or receive change notices, etc., all of which are provided for by Document. For this reason a private sub-object AppPrefs, which is a Document, is used to hold persistent information for Application. It is accessed only via Application. AppPrefs is recorded in ObjectMan as the "special" OID, one that can be retrieved when the application starts up without a regular OID. Thus, AppPrefs is the bootstrap object. AppPrefs contains a list of IPs, a trash folder OID, and various other values that need to be preserved from session to session, and serves as the root of the interested-party hierarchy.

A class Change is used to represent change notices of various types, corresponding to different kinds of changes. For memory management reasons, it inherits from MacApp's TObject class. Change has various subclass, one for each different type of change notice.

Figure 15:
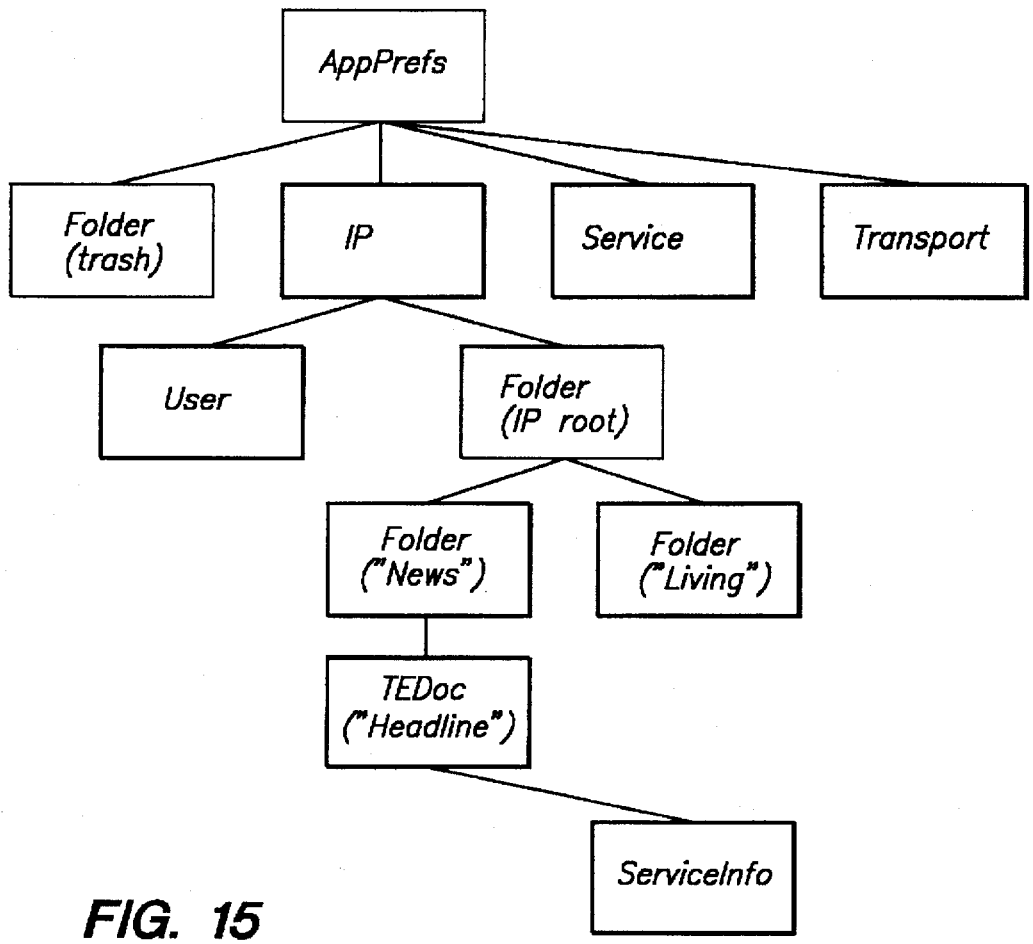
FIG. 15 is a diagram of "interested party" relationships in the electronic publishing tool of FIG. 13.

FIG. 15 shows a typical containment and interested party hierarchy. Boxes with bold outlines represent a list of objects, with an example set of descendants shown. For example, within each copy of the electronic publishing tool, there is only one IP root Folder. That Folder may contain numerous other Folders, among which might be a "Living" Folder and a "News" Folder. The "News" Folder might in turn contain numerous text documents, one of which might be a "Headlines" document. Each document may have associated with it multiple Serviceinfo objects containing service-specific information pertaining to that document.

Of the foregoing classes, Document, ContentObj, Folder and TEDocument play a prominent role in the present electronic publishing tool of the present invention. TEDocument operates in substantially the same manner as the TTEDocument class of MacApp (except as previously described). The Document, ContentObj, and Folder classes will therefore be described in greater detail.

During the lifetime of an object, certain events occur. First the object is created and initialized. Changes are made to the object that may need to be saved in various ways. Objects send change notices to other objects and respond to change notices from other objects in various ways. The object may become associated with certain service-specific objects. At some point, the object may be closed and freed, and at some later point, the object may be restored. The class Document (and, by inheritance, the classes ContentObj and Folder) is provided with methods relating to these and other events.

Among these methods are type-checking methods. In C++, type information is absent at run time. There is no way to find out which class an object is, or whether an object is a subclass of some other class. Because run-time type information is necessary to support persistence (and desirable for several other reasons), Document provides its own run-time type information protocol.

ObjectMan, in order to capture the correct initial state of an object so that the object may be provided to a remote machine, if necessary, requires that Document and ContentObj extend the standard MacApp initialization protocol, or "I methods." A mechanism is provided to allow each I method to know whether it is the leaf of the inheritance for a particular object or not, i.e., whether it is the most specific I method in the inheritance chain or not. If it is the most specific, it must call ObjectMan's NewInitializedObject after it (and all parents) have finished establishing the initial state of the object. The I method is only called for the object's first creation. When the object is restored from the database, initialization is not required. Copies of an object on remote machines start with a copy of the object in the state it is in after the I method has run.

When an action changes state in a Document and the document is to be saved, a method MarkDirty is called. Since Documents can save different parts of their state independently, MarkDirty takes a parameter indicating which part of the state is to be saved (the default being the system partition). MarkDirty does not perform the save itself. MarkDirty is therefore overridden when a class wants to take some immediate action at the time it becomes dirty. Unless MarDirty is called, a document will never be marked dirty.

A method DoSaveDocument is the standard method used to save all or part of an object. By default, DoSaveDocument saves only the partitions that are marked dirty. DoSaveDocument manages information stored in the object as to whether a partition is dirty, never saved flags, etc.

Each class is free to implement its own policies concerning when to consider the object's modification date changed. The decision might be linked to MarkDirty, or (for those subclasses that support explicit user saving) it might be linked to actual save operations by the user. A method UpdateModifierInfo is used to make the current time and user be recorded as the object's modification time and modifier. A method DoUpdateModifierInfo allows explicit modification time and user information to be passed in. Both methods result in a broadcast of the new modifier information.

Documents define their persistent state via a Save method. Each subclass redefines this method so as to first call the parent's Save method, then to write out fields specific to itself. A save handier is passed to the Save method, providing a series of write methods that accept basic data types.

If an object wants to save reference to another Document, is saves the OID of that object. It may assure that the other object will still be around when the saving object is restored by using the interested party mechanism.

When an object is requested from ObjectMan and it must be activated from the database, ObjectMan will first make an instance (based on the run-time typing information) of the object. A method Initialize () is called, but the object's I method is not called. Instead, a method Restore is called, which calls the parent's Restore method, and is provided with a restore handler having Read methods exactly paralleling the Write methods called in Save. After the object is restored, ObjectMan will invoke a DoneWithRestore method. This method is defined to do those things that the I method would have done that are appropriate to recreating, rather than initializing, the object.

Objects may have sub-objects that are not Documents whose state needs to be saved. These objects might have similar Save/Restore methods as those described, but it is nevertheless the job of the Document to save them, and on restore, to make the instance first and then begin restoring it.

The class Document replaces several MacApp close-related methods, principally to prevent those methods from calling Free (without consulting ObjectMan). ObjectMan is responsible for freeing an object when necessary. When an object is closed, it will first give all open windows a chance to send any final changes back to the object. Next, the objects checks to see if the user partition is dirty or not. If so, the standard "Save changes before closing?" dialog is presented. If the user chooses not to save changes, then one of two methods is called, either a simple Abandon or a special CheckAbandonNeverSaved. The regular Abandon method rereads the state of the user partition from the database, since the object might be reopened and should reflect then the state when it was previously opened. The CheckAbandonNeverSaved method broadcasts that the object is closing, so it can be removed from any containing objects.

Finally, ObjectMan's DoneWithObject is called, which decrements the in-use count. If this is the last use, then the object may be freed any time afterward.

Whenever an object makes a significant change that should be externally visible, it posts a change notice for broadcast to all interested parties. By objects posting changes "in the blind," rather than assuming that certain objects of certain classes need to know things and sending them messages, the extensibility of the electronic publishing tool is greatly enhanced.

Broadcast changes actually serve two purposes: letting other objects know about changes, and letting other copies of the same object know about changes so that they can take steps to reflect those changes. This latter process is referred to as synchronizing objects. Generally, a single broadcast can be used for both purposes. Occasionally, when a change that should not be externally visible needs to be communicated to other copies of an object, a sync-only broadcast can be sent.

Change notices use the subclass Change. Class Change provides the following fields: Source, Target, Type, Partition, and Collapsible. The Source field contains the OID of the object sending the change, while the Target field contains the OID of the primary other object "involved" in the change. This is sometimes the same as the source. In cases involving container classes, it is often an object added or removed. The Type field identifies the type of change. Each class defines a set of change types. The Partition field associates this change with a particular Save/Restore partition. Finally, Collapsible is a boolean value that indicates whether or not this change can take the place of any previous changes of the same type from the same source.

Subclasses of Change can be created to hold additional information. A change notice sent to interested parties should be self-sufficient, so that the receiving object does not need to ask for further information from the broadcasting object. Changes sent to sync another copy are required to be self-sufficient, as the receiving object typically will not be able to ask for more information from the broadcasting object.

Although Change objects are not Documents, they share some Document mechanisms. The same Save and Restore methods are used to make them persistent.

Changes are posted by calling ObjectMan's BroadcastChange method. For simple cases where a standard Change object will suffice, a version of BroadcastChange is used that takes the Source, Target, and Type as arguments and creates the Change object. If a specific subclass of Change is needed, it is created and initialized with a method IChange (Source, Target, Type) and then sent with BroadcastChange (change object).

It is often helpful to a user to inform them of problems, conflicts, etc. while they are still formulating their input, rather than after they have completed their input, for example by clicking 'OK'. Document classes therefore provide "preflight" methods for any method that might fail for certain argument values. Preflight methods are normally invoked by the user interface, and the details of their implementation and protocol may vary from class to class.

However, often part of the preflight testing depends on feedback from interested parties. While the normal BroadcastChange method does not return any value, a broadcast can be sent in Preflight mode to solicit opinions from interested parties. The broadcast object and change type is normally the same as is used in the regular, non-preflight method. However, a list of error messages is provided, and is filled in by interested parties. The return value will be given the worst level recorded by any of the interested parties (e.g., warning or error).

The Add and Remove InterestedParties methods of ObjectMan also take optional arguments that allow them to be exercised in preflight mode. This provision allows feedback from auto-interested parties on adding or removing an interest without actually doing it.

Interested parties receive change notices from objects they previously registered an interest in via a method ChangeOccured. Document subclasses override this method to process change notices for the particular types of changes they recognize, and inherit the Document method for other types of changes. No changes can be made to a Change object.

ObjectMan delivers change notices from an object's clone on another machine to a PlaybackChange method. This method is structured much like the ChangeOccured method, but typically responds to a different set of change notices. Whereas ChangeOccured receives changes from other objects, PlaybackChange receives changes from a copy of the object itself.

ChangeOccured and PlaybackChange differ in how the modification date of the object is set. Normally, when a change is generated locally (e.g., through the user interface), the modification date is updated. When a change sent from machine A is played back on a copy on machine B, then the modification date on B after playing back a change should be the later of B's modification date or the modification date on A. In the simple case, when changes only occur on machine A, and machine B simply tracks A, then after playback the modification date on B should be the same as that on A.

PlaybackChange methods deal with this by not setting the modification date when handling a change notice, except when the notice is a specifically a "new modification date" notice. In the latter case, the modification date is set to the greater of the current modification date or the change notice's modification date.

Rather than all objects that are Documents being required to register interest directly in order to receive change notices, an auto-interest facility may be provided to accomplish the same result much simply and more efficiently. In accordance with the auto-interest facility, the class Application receives a copy of every change notice, and it distributes it to a set of objects. In an exemplary embodiment, auto-interests are delivered to each Service object. In other embodiments, a protocol be used to add an object to the auto-interest list.

Apart from creation date and/or modification date, Documents can have two further dates associated with them: a release date and an expiration date. These dates are provided for use by publishing platforms, and represent the time at which a document should first be visible to users, and the time after which it should no longer be visible. Platforms may be instructed to remove a document after the expiration date. However, documents are not automatically removed from the electronic publishing tool itself after the expiration date.

The release and expiration dates on a document are "absolute" dates. Publishing platforms should remove a document from all folders based on the document's absolute expiration date. The class Folder provides another pair of dates that govern the appearance of a document within a particular folder.

A Document object maintains a list of associated ServiceInfo objects, which are created on demand. When a method GetServiceInfo (type) is called, a lookup is performed for a corresponding ServiceInfo object. If no such object is found, the service associated with that type constant is asked to make an appropriate ServiceInfo object, which is added to the Document's list and then returned to the caller.

In order to model the attached files found on many online services, the class ContentObj adds to Document support for binary attachments. In particular, the class ContentObj provides the ability to refer to, store and retrieve a single, arbitrary file in addition to whatever "content" is provided by ContentObj subclasses. Clients attach a file by providing a Macintosh "FileSpec." The file is immediately stored, so that further reference to the given file is not needed. ObjectMan makes a copy of the file. The classContentObj uses a "FileRef" mechanism provided by ObjectMan to implement attached files.

Attached files are saved in the user partition. Thus, if a user abandons changes, a newly attached file is lost. A deleted attachment, on the other hand, is preserved. Attaching or unattaching a file makes the user partition dirty, so that users will be asked whether to save changes or not, even if no other "content" changes are made.

Even though attachments are provided by ContentObj to all subclasses, users may be given access to attachments only through specific subclasses by simply not offering any user interface to attachments except from chosen subclasses. In an exemplary embodiment of the electronic publishing tool, only text documents have a user interface that accesses attachments.

Because objects of the class ContentObj will often originate as data in other applications, there is a provision for setting an external modification date. In some embodiments of the electronic publishing tool, this feature may be used to facilitate an incremental import process.

The class Folder is a subclass of ContentObj that can hold other objects. Folders can be used for a variety of purposes and in a variety of situations in which a set of objects needs to be managed. A number of Folders can be used to represent a hierarchy or directory structure.

Although Folders can be used for a variety of purposes, and can have various manifestations when published on an online service, Folders may generally be thought of as representing a directory structure (i.e., as in an operating system). In the present electronic publishing tool, all user-created content objects are contained within a hierarchy of Folders.

Each element in a Folder is represented by a FolderItem. The FolderItem contains: the OID(s) Of the contained object(s); the UniqueID of the folder item itself; several cached values from the contained object(s), to allow a view to be displayed quickly without activating each contained object; and several other values that each folder keeps about each item it contains.

As in many operating systems, including the Macintosh Finder, the Folder model of a hierarchy may be a directed acyclic graph, in which the same object may be inserted into multiple Folders. Folders operate like Finder folders in that they save changes immediately, without asking a user to save a Folder. All Folder data is saved in the system partition. Unlike the Finder, however, in an exemplary embodiment of the electronic publishing tool, there is no original folder as distinguished from a set of aliases. Instead, each FolderItem is an equal. Removing an object from a Folder only removes the FolderItem describing it, and does not directly delete the object itself. When the object is removed from the last Folder, it may be deleted from the database.

FolderItems are not themselves Documents, and thus are not independently persistent. They are "supervised" by their Folder. FolderItems have a UniqueID (instead of an OID) that permanently identifies them. All of the FolderItems for a folder are saved and restored at the same time, along with the rest of a Folder's attributes. A Folder includes the following attributes, some of which an IP may set and/or view: rifle, default number of days in which newly inserted references will expire, sort order of the body region (alphanumeric, arrival date, ascending, descending), auto insertion of time/date stamp into title, visual status information for each link, and owning IP (set by CS version only).

Folders register an interest in each object that is inserted into them, and remove interest when objects are removed from the Folder. As a result, an object will never be deleted from the database as long as it is in a Folder. The interest also allows Folders to keep cached values up to date, by receiving broadcasts whenever a contained object changes a value.

Although Folders are normally thought of as managing a single set of objects, for the purposes of sorting and positioning, Folders actually have three regions: header, body, and footer. By default, all actions take place in the body region. These regions can be used, for example, to "pin" an item to the top of an otherwise alphabetically or chronologically sorted folder. Likewise, an item can be "pinned" to the bottom in the footer. Each region can hold an unlimited number of objects. The header and footer are always manually positioned, while the body can be either manually positioned or sorted alphabetically or chronologically.

In an exemplary embodiment, Folder uses the MacApp class TLists to hold the FolderItems in each of the three regions. However, all access to these lists is hidden behind certain access functions, set forth in greater detail in the attached Appendix G, a Content Objects Function Reference.

The term 'link' is used herein to refer to a FolderItem, and particularly to the non-cached values it keeps about an object. In the electronic publishing tool user interface, these values are referred to as 'reference' values.

For purposes of accessing a Folder, the Folder can be thought of as an array, with elements at indexes 0 through size-1 (without regard to regions). Folder items may be accessed quickly by index, and indexes may be used to iterate through an entire Folder's contents. The current index of an item may be determined using one of the following lookup methods, after which the index may be used to get or set values for that Folder item.

One lookup method is by UniqueID, which positively refers to a particular Folder item. UniqueIDs can be saved and are unique across folders. Callers can therefore tell if a UniqueID is not within a folder. Another lookup method is by contained object OID. Because there can be more than one folder item within a given folder referring to the same object, a method FindAllIndexesForOID is used to ask for a list of all indexes pointing to a given OID.

A method Insert () provides a basic method to insert an object into a Folder. Various other methods take a list, accept an existing FolderItem to copy values from, append items rather than inserting them at a specific point, etc. The basic Insert and Append methods return the UniqueID of the item that was inserted.

Similarly, a method Remove () provides a basic method to remove a single FolderItem from a Folder. Various other methods remove all items that refer to a given object, take a list, or remove all objects. Interest is removed, and objects with no other interested parties are eligible for deletion from the database at any time (possibly before the return of the Remove method).

Sometimes it may not be possible to insert an Object into a folder, or it may be possible within the electronic publishing tool but may not work as intended on a particular publishing platform. Accordingly, a PreflightAppend call is provided to test the acceptability of an object, and may be called before any of the regular insert calls.

The properties of a FolderItem are accessed through the Folder, using the index of the item to identify it.

Once an object has been inserted, a method Reposition may be used to reposition it within the Folder. Reposition can move a FolderItem within and between the header/body/footer regions. The basic Reposition method takes the UniqueID of the item to move, and the index of the position to insert before. The region argument is only considered if the index is on the current border between the header and body regions or the body and footer regions.

Repositioning can only be done in the body when the Folder is in a manual sort mode. If an alphabetical or chronological sorting is selected, the identified item remains where the sort places it. Changing the Folder from manual sort to alphabetical or chronological sort loses the previous manual positionings; when changing from alphabetical or chronological sort to manual positioning, the FolderItems begin at their previously sorted positions.

As noted previously in relation to Documents, individual documents have absolute release and expiration dates. Folders add to that a release and expiration date that governs visibility just for a particular link. Thus, documents can be visible in different folders at different times.

As a simple way to set Folder-specific expiration behavior, provision is made for setting a default number of days of visibility. When this value is set, each new item is given an expiration date that is the current date (or the release date, whichever is later) plus the specified number of days. (The release date is the date at which the item should first appear on a service.) Changes in the default value do not affect current Folder items.

The class Folder may be subclassed to provide more specialized operations that are based on containing objects of a more specific type. For example, a Software folder might only contain text documents with attached binary files, and it might provide additional information such as the number of downloads. To accomplish this, a subclass of FolderItem would be created to track the additional information about each contained object, and thenFolder would be subclassed to use this new item class. Hooks are provided to allow subclasses to create different kinds of FolderItems and fill in their data. Minor extensions to Folder can be made without making a new FolderItem.

The flexible, extensible architecture of the present electronic publishing tool allows for electronic publication of a wide variety of content objects across an equally wide variety of platforms. The class libraries representing base classes can be extended, for example to develop movie content objects or other kinds of content objects. Additional service gateways may be provided to interface to foreign systems (e.g., Lotus Notes). Storage interfaces may be provided to different kinds of object storage mechanisms (e.g., to support a specialized database, CD ROM, etc.). Application program interfaces to the electronic publishing tool may be used to, at the abstract object level, modify or tune the system's operation, either remote or local (e.g., to provide a completely different client, to provide specialized processing over the objects, etc.). In each of the foregoing instances, scripting facilities may be provided.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. In a distributed database system, a method of synchronizing information between a plurality of sites and a central location, comprising the steps of, for each of said plurality of sites:

establishing a first database portion at the central location and a second data base portion at the site, where the second database portion is a substantial replica of the first database portion, wherein each of the first and second database portions comprise a plurality of named information items including information items to be output in such a way as to be perceived by a user, and wherein said plurality of named information items are managed at the central location by a database engine;

changing the second database portion at the site;

reporting changes in the second database portion to the central location;

at the central location, sending one or more messages describing changes in the second database portion to one or more named information items of the first database portion affected by the changes, without the database engine itself effecting the changes; and the one or more named information items of the first database portion affected by the changes responding to the one or more messages describing changes in the second database portion by updating themselves to reflect the changes to the second database portion reported to the central location.

2. The method of claim 1, wherein the first database portion and the second database portion each comprise a plurality of information items.

3. The method of claim 2, wherein, at each of the plurality of sites and at the central location, multiple program entities, including information items, are allowed to subscribe to changes to any information item, comprising the further steps of, at each of the plurality of sites and at the central location:

registering a plurality of program entities as subscribing to changes to a particular information item;

changing the particular information item; and broadcasting to each program entity registered as subscribing to changes to the information item a notice describing changes to the information item.

4. The method of claim 3, comprising the further steps of:

sending a synchronization notice from one of the sites to the central location a notice describing changes to an information item changed at the one site.

5. The method of claim 4, wherein each program entity and each information item is identified by a identifier, comprising the further steps of:

at the central location, sending the synchronization notice to a program entity having a same identifier as the information item changed at the one site, wherein the program entity is a corresponding information item corresponding to the information item changed; and changing the corresponding information item to reflect changes to the information item changed at the one site.

6. The method of claim 5, comprising the further step of:

at the central location, broadcasting, to each program entity registered as subscribing to changes to the corresponding information item, a notice describing changes to the information item.

7. The method of claim 6, wherein each program entity includes a first program segment governing how that program entity will respond to notices, other than said synchronization notice, of changes to an information item to which the program entity has subscribed, comprising the further steps of:

receiving at each program entity registered as subscribing to changes to the information item the notice describing changes to the information item; and at each program entity registered as subscribing to changes to the information item, responding to the notice describing changes to the information item in a manner prescribed by the first program segment included within that program entity.

8. The method of claim 7, wherein each program entity includes second program segment governing how that program entity will respond to said synchronization notice, comprising the further steps of:

receiving the synchronization notice at a program entity having a same identifier as the information item changed at the one site; and responding to the synchronization notice in a manner prescribed by the second program segment included within that program entity.

9. The method of claim 3, wherein program entities are allowed to cancel subscriptions to changes to any information item, comprising the further step of:

deleting registration of a program entity that previously subscribed to changes to a particular information item but later cancelled its subscription to changes to the information item.

10. The method of claim 9, comprising the further step of deleting an information item from the first database portion.

11. The method of claim 10, wherein an information item is deleted only after any previous subscriptions to changes in that information item have been cancelled.

* * * * *